United States Patent
Combes et al.

(10) Patent No.: US 6,704,366 B1
(45) Date of Patent: Mar. 9, 2004

(54) TIME AND FREQUENCY INTERLEAVING SYSTEM FOR TRANSMITTING DIGITAL DATA BETWEEN FIXED OR MOBILE STATIONS

(75) Inventors: Bernard Combes, Eragny (FR); Pascal Paqueron, Eragny (FR); Cyril Voillequin, Eragny (FR); Pierre Lemahieu, Paris (FR)

(73) Assignee: Sagem SA, Paris (FR)

( * ) Notice: Subject to any disclaimer, the term of this patent is extended or adjusted under 35 U.S.C. 154(b) by 731 days.

(21) Appl. No.: 09/588,499

(22) Filed: Jun. 7, 2000

(30) Foreign Application Priority Data

Jun. 8, 1999 (FR) ............................................. 99 07185

(51) Int. Cl.$^7$ ................................................. H04J 1/02
(52) U.S. Cl. ........................ 375/260; 370/483; 370/210; 370/343
(58) Field of Search ................................. 375/260, 265, 375/285, 296, 340, 341; 370/480, 483, 485, 478, 210, 343

(56) References Cited

U.S. PATENT DOCUMENTS 5,610,908 A * 3/1997 Shelswell et al. ........... 370/210
5,923,666 A * 7/1999 Gledhill et al. .............. 370/480

FOREIGN PATENT DOCUMENTS

| EP | 0565470 | 10/1993 |
| EP | 0903883 | 3/1999 |
| FR | 2729030 | 7/1996 |

OTHER PUBLICATIONS

Wu Y et al: "Interleaving or Spectrum-Spreading in Digital Radio Intended for Vehicules"—EBU Review Technical, CH, European Broadcasting Union, Geneva, juin 1986 (Jun. 1986), pp. 128–142.

* cited by examiner

Primary Examiner—Amanda T. Le
(74) Attorney, Agent, or Firm—Larson & Taylor, PLC

(57) ABSTRACT

A transmitter for a radio transmission system has an encoder for encoding data according to an error correction code and supplying a digital output stream of bits which are then distributed over a selectable number of carriers belonging to a group of carriers that are uniformly distributed over a transmission channel, so as to constitute a frequency division multiplex. Then the stream is subjected to time interleaving responsive to a distribution given by the bit spreading module which achieves distribution and frequency interleaving operating on the carriers; the stream is then modulated in phase or possibly a phase and amplitude. A receiver matched with the transmitter has, in sequence, a time and frequency synchronizing module, a time-frequency transform module, a phase demodulator, a frequency deinterleaving module, a time deinterleaving module, and a decoder performing Viterbi decoding, bit deinterleaving, and a selecting interface module for selecting a set of operating parameters corresponding to those of the transmitted stream.

11 Claims, 2 Drawing Sheets

FIG.3.
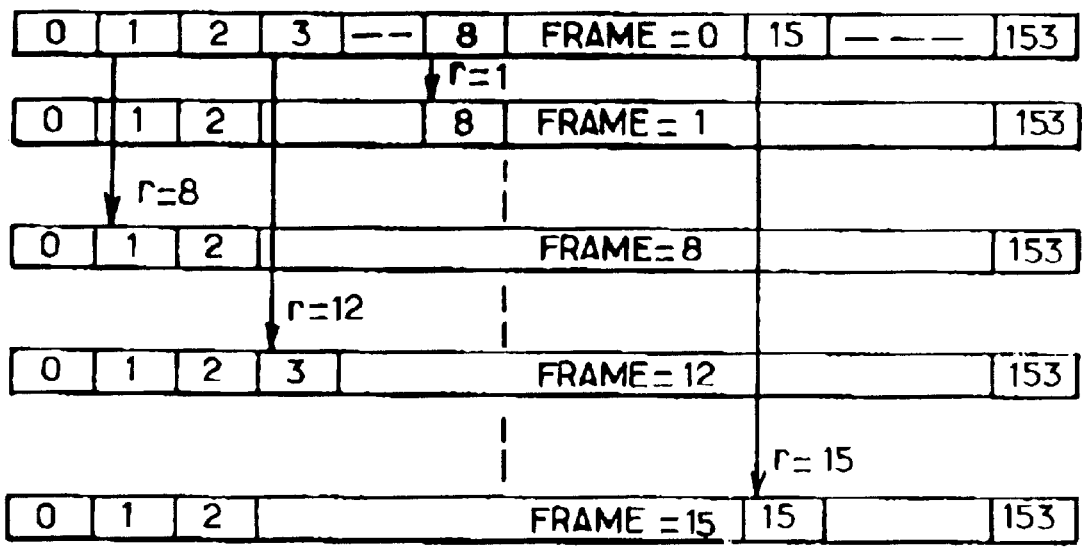
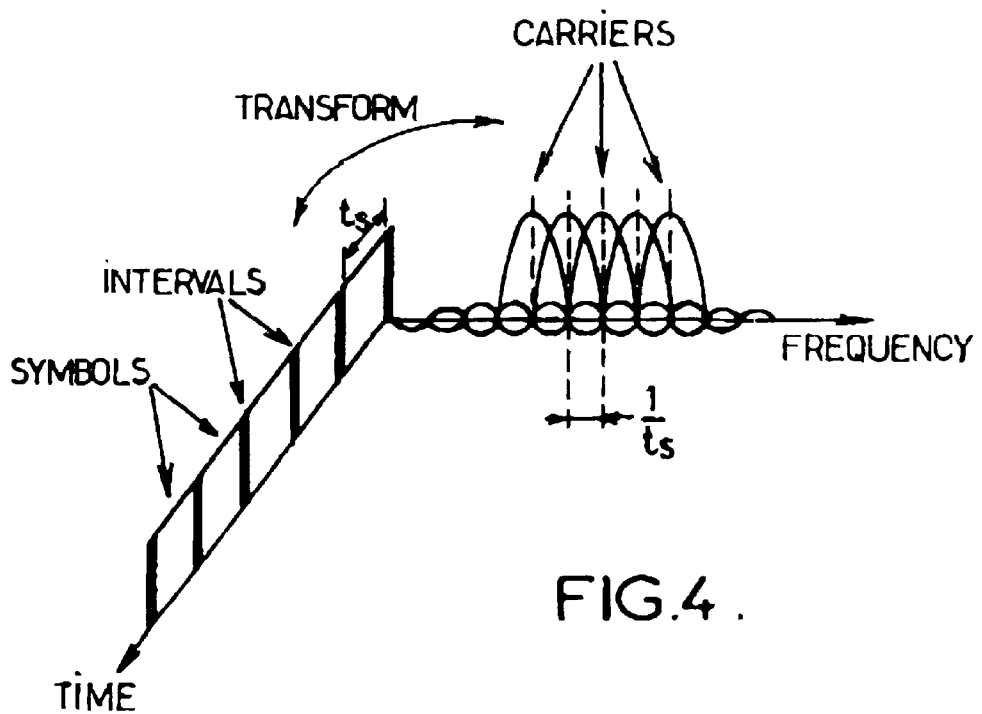
FIG.4.

TIME AND FREQUENCY INTERLEAVING SYSTEM FOR TRANSMITTING DIGITAL DATA BETWEEN FIXED OR MOBILE STATIONS

The present invention relates to systems for transmitting data input in digital form representing any kind of parameter, which can constitute, in particular, sound and/or images, the data being transmitted to and from mobile stations. The present invention also relates to the transmitters and receivers that form parts of such a system.

BACKGROUND OF THE INVENTION

The term "to and from mobile stations" should be interpreted as meaning that the system is suitable for accommodating the constraints that are specific to that circumstance, while nevertheless remaining entirely suitable for transmission when both the transmitter and the receiver are stationary.

The transmission and broadcasting of data by radio suffers from disturbances having a very wide range of origins and characteristics. Received signal attenuation increases with distance and with the presence of obstacles and can reduce power on reception to a value that is comparable to that of disturbances. Multiple echoes give rise to interference between successive symbols. They can be very numerous in an urban environment and they can lead to very high transmission delays in an open environment. Certain kinds of industrial interference are continuous, but they are generally concentrated in frequency. Other disturbances of very short duration can, on the contrary, occupy a wide frequency spectrum. Finally, in a context of transmission between a mobile transmitter and/or receiver, the transmission channel can vary in non-negligible manner over time (in terms of echo level, signal attenuation, etc.), and the speed of such variation increases with increasing travel speed.

Even before considering transmission or broadcasting to or from mobile stations, methods and systems were designed to increase immunity to interference. U.S. Pat. No. 3,988,677 proposes implementing concatenated Reed Solomon encoding associated with convolutional encoding and time interleaving. And then, for the purpose of broadcasting sound to mobile stations, the article entitled "Interleaving or spectrum spreading in digital radio intended for vehicles" by D. Pommier et al., published in EBU Review, Technical No. 217, June 1986, proposes associating frequency interleaving with time interleaving while using a form of multicarrier modulation known as coded orthogonal frequency division multiplex (COFDM). That approach has been accepted in a standard known as DAB for broadcasting sound to mobile stations. By using a narrow passband (1.5 MHz) and modulation with a small number of states (MDP4), it is restricted to a low data rate. The DVB-T broadcast standard likewise makes use of COFDM principles, but with a wider passband (8 MHz) and modulation having a larger number of states (64 QAM), thus making higher data rates possible. However, that standard relates clearly to use with transmitters and receivers that are stationary since it does not define time interleaving and it uses a number of carriers that is large compared with the passband (a minimum of 1704 carriers for an 8 MHz passband).

OBJECTS AND SUMMARY OF THE INVENTION

The present invention consists in a system for transmitting digital data that is suitable for adapting to a very wide range of propagation conditions because of its ability to parameterize its characteristics. A major, although not exclusive, application of the invention lies in transmitting video data from a commentary vehicle or telemetry from a test vehicle.

For a commentary vehicle, the environment can change from one venue to the next, in particular the number and delay of multiple paths can change considerably. The transmitter can also be located at a stationary station or it can be carried by vehicles having a wide variety of speeds, giving rise to a correspondingly wide variety of Doppler spreads and effects. The present invention enables the transmitter and the receiver to be configured in such a manner as to make use on each occasion of a transmission signal that is adapted to various different types of transmission conditions.

The present invention also makes it possible to transmit data at a high rate (well above that defined by the DAB standard) in a context where the transmitter and/or the receiver is/are mobile. This ability to operate at a high rate in a mobile environment is provided firstly by time interleaving and secondly by the option to use a number of carriers that is small relative to the passband. Time interleaving serves to combat various disturbances that the transmission can encounter from time to time (due to a temporary change of environment created by the transmitter and/or the receiver moving). The option of using a small number of carriers, which implies a high rate of modulation on each of them, makes it possible to combat fast variations of the channel over time (Doppler spreading).

For these purposes, the invention provides a transmitter for a radio transmission system, the transmitter comprising:
  an encoder receiving input data and supplying a digital stream whose content is the result of error correcting encoding;
  a spreader module for spreading bits over a selectable number of carriers belonging to a group of carriers that are uniformly distributed over a channel, so as to constitute a frequency division multiplex;
  a time interlacing module for providing time interlacing consistent with a spread given by the spreader module;
  a frequency interlacing module operating on the carriers defined by the spreader module;
  a phase modulator or possibly a phase and amplitude modulator;
  a frequency-time transform module;
  a guard time insertion module for optionally inserting guard times that increase the time periods of the symbols; and
  a selector module or interface enabling a set of operating parameters to be selected that corresponds best to the propagation conditions and to the type of interference expected.

The term "module" should be understood as designating a hardware or software component enabling the dedicated function to be performed; in practice many of the modules can be combined in the form of an application specific integrated circuit (ASIC).

In an aspect of the invention, each set of parameters is defined by a particular combination of parameters constituted by encoding efficiency, time interleaving depth, number of carriers, type of modulation, and length of any guard times. In an embodiment, each set of parameters makes use of different values for all of the parameters. In another embodiment, some of the parameters are fixed or adjustable independently of the others, the selectable sets relating to pairs or triplets of parameters.

Before any particular mission, it is thus possible for the operator to select a set of parameters that is suitable for the nature of the transmission channel that is known a priori. For example, when numerous paths are present, it is preferable to adopt a large number of carriers to reduce the data rate on each carrier and to lengthen the guard times. In contrast, this selection should be avoided when the transmitter is carried by a fast-moving vehicle such as a helicopter, given the possibility of Doppler spreading occurring with its unfavorable effect on symbols that are too long. It is then preferable to use a small number of carriers, corresponding to a short symbol time, which will thus be less sensitive to fast time variations in the transmission channel.

In another aspect of the invention, the number of carriers transmitted in parallel and the bandwidth used are such that high transmission data rates (higher than that defined by the DAB standard) are possible with a mobile transmitter and/or receiver, insofar as the data rate on each transmitted carrier is high enough to combat Doppler spreading effectively.

The transmitter advantageously also has a module for inserting analysis symbols, examples of which are given below, which symbols are intended for use by the receiver.

The resulting digital stream is applied to a digital-to-analog converter followed by means for transposition to the transmission frequency.

In a system, the receiver performs operations that are the duals of those performed by the transmitter and likewise has an interface enabling parameter values to be selected in such a manner as to make them correspond to the parameters of the transmitter, with these values being transmitted over an instruction network or during a preliminary transmission that is performed using parameters fixed on default values.

A module for inserting analysis symbols on transmission makes it easier for the receiver to be synchronized in frequency and in time, and also makes it possible to analyze any interference that may be present in the frequency band used by the transmission system. In particular, it is possible to use a null analysis symbol, i.e. without any carrier being transmitted, thereby enabling the receiver to listen to interference in the absence of transmission, and consequently to determine which carriers are the most disturbed. In the frequent case where decoding is performed by an algorithm that seeks a likelihood maximum (Viterbi algorithm), determining which carriers are subject to most interference makes it possible to give them lower weighting coefficients in the decoding trellis, and thus attenuate the effect of the interference.

Furthermore, taking analysis symbols into account on reception can make it possible to determine an optimum selection of parameters on transmission. In some cases, these parameters can be returned to the transmitter via a return channel, for the purpose of obtaining a new adjustment.

In practice, a "null" symbol is generally inserted at the beginning of each transmitted data frame, together with a symbol dedicated to synchronizing the receiver.

A system comprising a transmitter and a receiver of the kinds described above can provide a data rate that is greater than the maximum rate authorized by the DAB standard while still remaining adapted to conditions of use whether stationary or mobile, depending on the number of carriers used for transmission.

BRIEF DESCRIPTION OF THE DRAWINGS

The above characteristics and others will appear more clearly on reading the following description of a particular embodiment, given by way of non-limiting example.

The description refers to the accompanying drawings, in which:

FIG. 3 is a diagram for showing one mode of time interleaving; and

FIG. 4 is a diagram for showing the principle on which the transmission of a COFDM stream is based.

DETAILED DESCRIPTION

The system shown in the example makes use of a passband that is slightly narrower than 8 MHz, and thus allows a payload data rate that can be as great as 12 Mbit/s in MDP4, for example, while still remaining adapted to stationary or mobile transmission conditions. Higher data rates can be achieved by changing the type of modulation (MDP8, MAQ16, MAQ64, ... ) and/or by increasing the width of the passband used.

The time/frequency transform used is of the Fourier transform type. The resulting signal is then referred to as a coded orthogonal frequency division multiplex (COFDM) signal: the transmitted carriers are orthogonal and modulated by respective code bit sequences.

Figure 1:
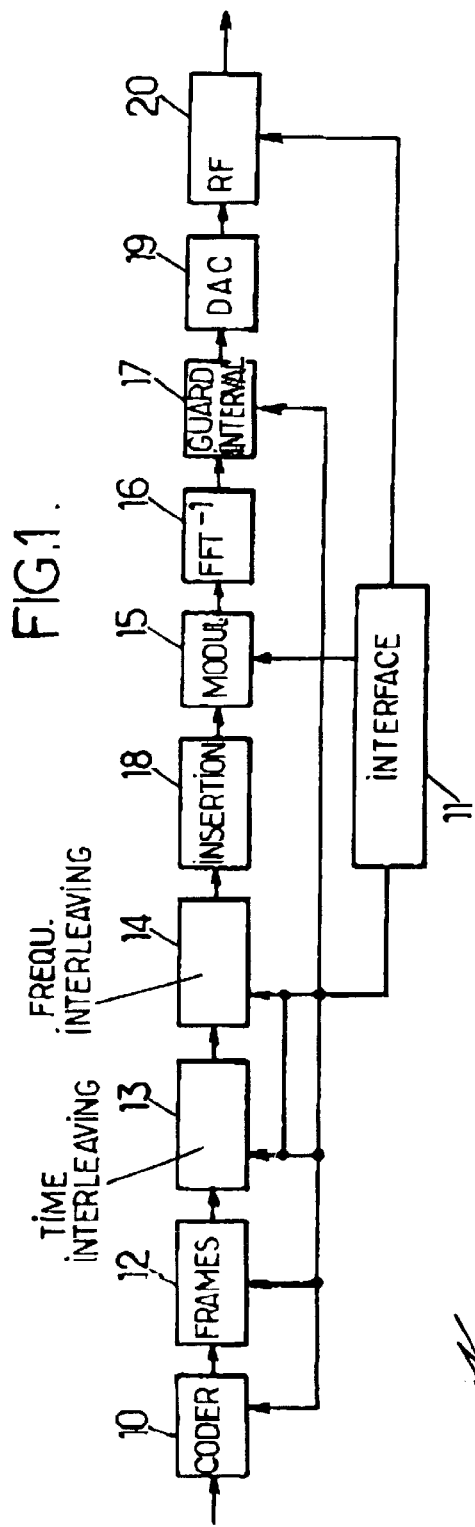
FIG. 1 is a block diagram of the transmitter of a system of the invention.
Figure 2:
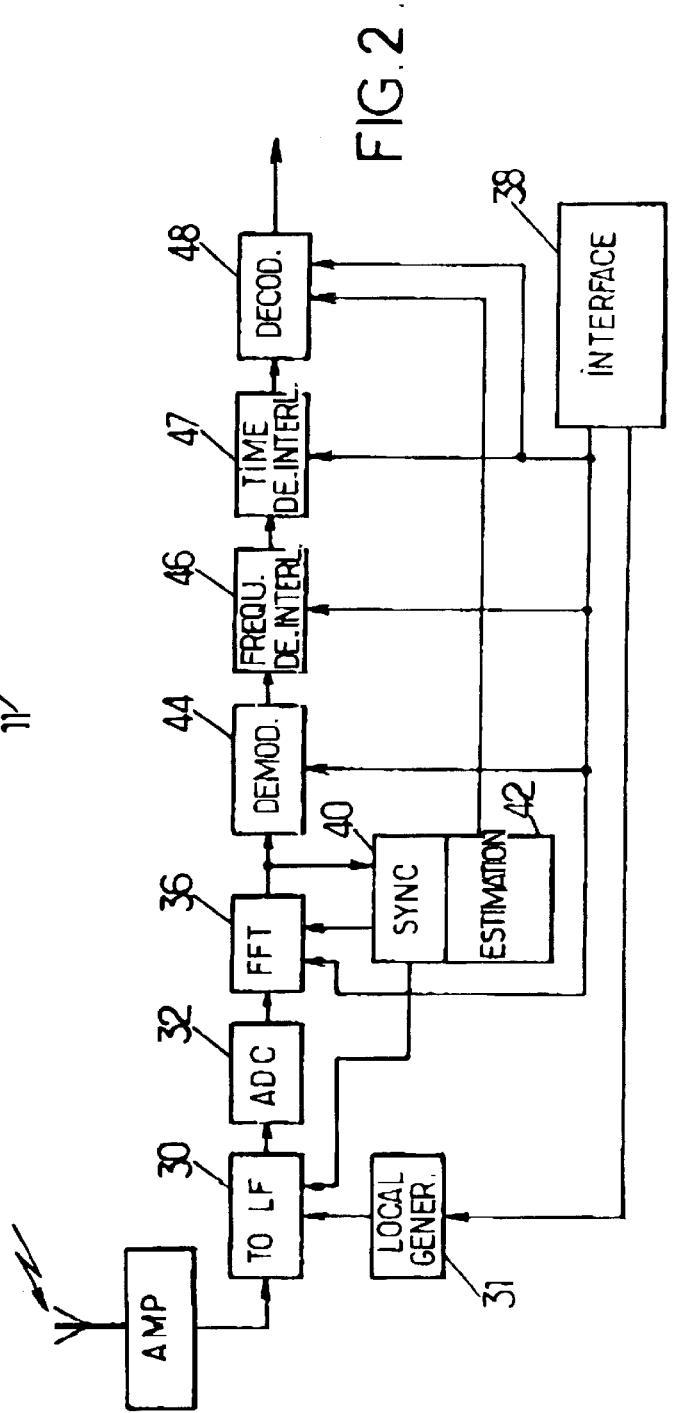
FIG. 2 is a block diagram of a receiver.

The transmitter shown by way of block diagram in FIG. 1 comprises an encoder 10 which receives a constant binary data rate at its input, e.g. constituted by MPEG2 frames having the structure defined in the DVB ASI standard. The encoder which can be of any conventional structure performs two concatenated encodings which are separated by bit level interleaving. Preferably, the following are used in cascade: Reed Solomon block encoding with a first efficiency R1, then bit-interleaving, and finally convolutional encoding with a second efficiency R2.

The efficiency of the block encoding can be determined once and for all, e.g. an efficiency of 188/204, as is the case with the DVB-C, DVB-S, and DVB-T standards. In contrast, the convolutional encoding has efficiency that can be parameterized, making it possible to select a range of values by means of an interface 11. In particular, this efficiency can have any one of the following values: 1/2, 2/3, 3/4, 5/6, and 7/8. The efficiency selected is one of the elements that makes it possible for any given passband to establish a compromise between authorized data rate and robustness of the system against disturbances in the transmission channel.

The encoder can also be designed to receive an arbitrary binary data stream accompanied by an associated clock signal instead of receiving an asynchronous MPEG2 stream.

The module 12 serves to prepare for making up the COFDM stream. It puts the binary stream coming from the encoder 10 into frames. This framing defines the number Ns of payload COFDM symbols in each transmitted frame, the number Np of carriers used for transmitting each COFDM symbol, and the number M of bits carried by each carrier at any given instant. Each frame thus comprises Ns×Np×M bits. These frames have provision for subsequent insertion of analysis symbols. Frame size is therefore determined in such a manner as to ensure that each newly-received frame can be analysed regularly and sufficiently frequently on the basis of these symbols. For example, frame durations of several tens of milliseconds can be provided.

The number Np of carriers is advantageously parameterizable. For example, it can take the following values; 112, 224, 448, 896, or 1792, independently of the transmitted payload data rate. In the context of an embodiment using a bandwidth of 8 MHz, it is possible to use a number Np of carriers that is much less than 1704 (the number used in DVB-T) thus making it possible to operate with mobile transmitters and/or receivers.

A time interleaving module 13 and a frequency interleaving module 14 are placed in cascade and reorganize the contents of the frames defined by the module 12 without changing format. The kinds of interleaving performed are of the same type as those used in DAB. However, the present invention makes it possible to parameterize the depth N of time interleaving on command from the interface 11 so as to reduce transmission delay, if necessary.

In an advantageous embodiment, N which is also the number of branches in the time interleaving module, has the value 0, 2, 4, 8, or 16. Zero depth, i.e. no time interleaving, can be used when the transmission channel does not vary over time and the operator seeks to minimize transmission delay.

By way of example, FIG. 3 shows interleaving over a cycle of N=16 frames. In each frame, the bits are given a delay equal to an integer number of frames and they change frame without changing position within a frame.

The frequency interleaving module 14 operates at bit level on each COFDM symbol. The bit-mixing algorithm is of the same type as that used in DAB, but adapted to the number of carriers selected.

The module 18 enables analysis COFDM symbols to be inserted at the beginning of each frame. In general, for each frame, a null COFDM symbol and a synchronizing COFDM symbol are provided. The null symbol is characterized by transmission being suppressed for the duration of one COFDM symbol (all carriers are set to zero). The synchronizing symbol is a special symbol stored in the receivers of the system and serving to analyze the transmission channel and to synchronize the receiver in time and in frequency.

For each carrier, the modulator 15 uses differential phase modulation. It transforms the bit stream into a stream representing differentially-encoded complex symbols. In general, four-state or eight-state modulation will be used, known as DQPSK (or MDP4) or D8PSK (MDP8). The modulator can be designed to use one or other of those two kinds of modulation under the control of the interface 11.

The module 16 which performs an inverse fast Fourier transform $FFT^{-1}$ transforms the complex COFDM symbol stream defined in the frequency domain into a time domain COFDM signal. Processing is performed in blocks of Nfft points where Np carriers are processed on each occasion, the remaining Nfft-Np points being set to zero.

The size Nfft of the Fourier transform depends on the number of carriers used. In particular, the following correspondence table can be used:

| number of carriers | 112, 224, 448, 896, 1792 |
|---|---|
| size | 128, 256, 512, 1024, 2048 |

Size is the next power of 2 greater than the number of carriers. It is controlled directly by the number Np of carriers used, which number can be parameterized in an advantageous embodiment.

The module 17 is designed to insert a guard time between successive COFDM symbols, so as to reduce the multi-path effect by creating a buffer zone ahead of each symbol to absorb echoes and reduce the risk of interference between symbols. The selected length of guard time is the result of a compromise. The longer the guard time the greater the tolerance of the transmission to long echo delays. However adding a guard time to the time required for a payload symbol decreases the available data rate. Advantageously, the module enables the guard time to be parameterized from the interface 11. By way of example, available guard times can have lengths equal to 1/4, 1/8, 1/16, or 1/32 of the duration of a COFDM symbol.

The digital-to-analog converter 19 transforms the COFDM stream into an analog signal which has the advantage of occupying a steep-sided spectrum band. A signal carrying data at 12 Mbit/s can thus present a bandwidth of less than 8 MHz.

This gives rise to a signal of the kind shown diagrammatically in FIG. 4. In the frequency domain, the carriers are orthogonal (spaced apart by a frequency difference equal to the reciprocal of the payload time ts required for a COFDM symbol). In the time domain, each carrier is MDP4 or MDP8 modulated by symbols of payload duration ts. This duration ts is extended by a parameterizable guard time tg for the purpose of absorbing possible transmission echoes. Transfer between the frequency domain and the time domain is performed on transmission by means of an inverse fast Fourier transform. This transfer is performed in the opposite direction on reception, by means of a fast Fourier transform.

Finally, the radiofrequency transposition module 20 serves to bring the frequency up to the transmission carrier frequency, generally a few GHz. It will often be necessary to perform a plurality of successive mixings so as to reach a final working frequency of more than 1 GHz. This frequency is generally programmable by the user, independently of the other parameters.

The above-mentioned parameterizing interface 11 enables the user to select one particular transmitter operating mode from a plurality of modes. The various modes are predefined and correspond to combinations that are optimized as a function of disturbance factors or of data rate requirements under particular conditions of use. In particular, several sets of parameters can be provided corresponding to the commoner cases, together with additional sets corresponding to conditions that are particularly severe in the following respects:

attenuation and echo;

attenuation and speed of the vehicle carrying the transmitter or the receiver;

tolerance to attenuation while maintaining a high data rate; and maximizing data rate, in spite of reduced ability to withstand attenuation.

By way of example, the following parameter values can be provided for the basic modes of operation:

| Reception conditions or constraints | Convolution encoding efficiency | Time interleaving depth | Type of modulation | Number of carriers | Guard time |
| --- | --- | --- | --- | --- | --- |
| weak signal, interference present | 1/2 to increase robustness | maximum (16 in this example) | MDP4 to increase robustness | variable depending on echoes and speed of channel variation | variable depending on transmission echoes |
| long echoes in a channel fluctuating slowly | variable depending on signal and interference levels | maximum (16 in this example) | MDP4 or MDP8 depending on signal level and on interference | large | large |
| channel fluctuating quickly | variable depending on signal and interference levels | maximum (16 in this example) | MDP4 to increase robustness | small | variable depending on transmission echoes |
| large data rate | 7/8 to increase data rate | maximum (16 in this example) | MDP8 to increase data rate | variable depending on echoes and on the speed of channel variation | variable depending on transmission echoes |
| short transmission delay | variable depending on signal and interference levels | small or zero | DQPSK | variable depending on echoes and speed of channel variation | variable depending on transmission echoes |

The term "variable" in the table means that the corresponding parameter must be set on one of the possible values in a manner that is consistent with a defined mode of operation.

For example, a mode defined as withstanding 5 µs echoes must have a guard time of at least 5 µs. With the configuration described above, that can correspond, for example, to a mode having 896 carriers and a guard time of 1/4.

Most receiver modules perform operations that are the inverses of the operations performed by the corresponding modules of the transmitter.

The module 30 for transposition to low frequency converts the input microwave signal to a final center frequency that enables it to be digitized. For this purpose, it uses a local oscillator 31 providing a plurality of adjustable frequencies.

The module 32 transforms the analog stream into a digital signal.

The fast Fourier transform module 36 transforms the time COFDM signal into a stream of complex symbols in the frequency domain. The Fourier transform implemented depends on the number of carriers used, which can be parameterized from the user interface 38. This Fourier transform applies only to the payload portion of COFDM symbols, with the guard time not being processed.

A synchronization module 40 which has no direct counterpart in the transmitter makes use of the synchronization symbol to position the Fourier transform window on the payload portion of COFDM symbols, while avoiding the guard times. In addition, the analysis performed by the module 40 serves to correct the frequency difference that can exist between the transmitter and the receiver by controlling the last stage of the low frequency transposition.

A module 42 for estimating interference serves to determine the power of interference on each of the frequencies used. Measurement is performed once per frame within the duration of the null symbol. Interference power is stored so as to supply a reliability index for associating with each of the carriers, and thus with the symbols carried by them. These indices are used in the final Viterbi decoding.

The demodulation module 44 performs an operation which is the dual of that performed by the modulation module 15. It transforms the stream of complex symbols into a stream of bits which are weighted depending on the power level of each carrier on reception. Thus, the receiver can take account of the characteristics of the channel which strengthens some carriers and attenuates others.

The frequency deinterleaving module 46 and the time deinterleaving module 47 perform operations which are the duals of the operations performed by the modules 13 and 14 in the transmitter.

The decoder module 48 is designed to take account of the concatenated nature of the two kinds of encoding performed on transmission. It decodes the convolutional code, it performs bit deinterleaving, and finally it decodes the block code. In general, the convolutional code is decoded by Viterbi decoding with soft decision-making. In order to determine maximum likelihood, it takes account of the estimate made concerning interference on the various carriers and also concerning carrier attenuation so as to reduce the influence of carriers that are degraded. This operation is performed by assigning a weighting index to each bit, where the index depends on these two factors.

The parameterization module 38 is designed to select sets of parameters that are the same as those provided on transmission. In general, the set of parameters used for a particular transmission is communicated to the receiver via an order network. Which particular set of parameters is selected will often be based on a priori knowledge of the channel. Nevertheless, if a return path exists, provision can be made for a prior selection procedure which consists in performing various tests using different sets of parameters.

What is claimed is:

1. A transmitter for a radio transmission system, comprising, in succession:
   an encoder for receiving input data and encoding said data according to an error correction code, supplying a digital output stream of bits;
   a bit spreading module for distributing said bits over a selectable number of carriers belonging to a group of carriers that are uniformly distributed over a transmission channel, so as to constitute a frequency division multiplex;
   a time interleaving module for providing time interleaving responsive to a distribution given by the bit spreading module;
   a frequency interlacing module operating on the carriers defined by the spreader module;
   a phase modulator or possibly a phase and amplitude modulator;
   a frequency-time transform module for delivering symbols;
   a guard time insertion module for optionally inserting guard times that increase time periods of the symbols; and
   an interface module for enabling selection of a set of operating parameters that corresponds best to actual propagation conditions and type of jamming expected.

2. A transmitter according to claim 1, wherein each set of parameters consists of a particular combination of parameters constituted by encoding yield, time interleaving depth, number of carriers, type of modulation, and length of guard times.

3. A transmitter according to claim 2, wherein each set of parameters has different values for all of the parameters included in the set.

4. A transmitter according to claim 2, wherein some of the parameters are fixed or adjustable independently of the others, the selectable sets relating to pairs or triplets of said parameters.

5. A transmitter according to claim 1, further including a module for inserting analysis symbols.

6. A transmitter according to claim 1, wherein said analysis symbols are one or more symbols selected among the group consisting of null symbols and synchronization symbols.

7. A transmitter according to claim 1, wherein the modulation is four—or eight—state differential modulation.

8. A transmitter according to claim 1, wherein the frequency-time transform is an inverse fast Fourier transform $FFT^{-1}$, thereby supplying a COFDM signal.

9. A receiver for a radio transmission system, the receiver comprising, in sequence:
   a time and frequency synchronizing module;
   a time-frequency transform module depending on an operating selectable parameter representing a number of carriers and also eliminating guard time;
   a phase demodulator or phase/amplitude demodulator;
   a frequency deinterleaving module;
   a time deinterleaving module;
   a decoder performing in succession Viterbi decoding, bit deinterleaving, and Reed Solomon decoding; and
   a selecting interface module for selecting a set of operating parameters corresponding to those of the transmitted stream.

10. A receiver according to claim 9, including means for determining which carriers are subject to most interference by listening during periods in which null symbols are transmitted so as to allocate smaller weighting coefficients thereto while performing decoding with soft decision-making.

11. A system for transmission to or from a mobile station enabling payload data rates to be used that are greater than those made possible by systems complying to the DAB standard, said system comprising:
   a transmitter having, in sequence:
      an encoder for receiving input data and encoding said data according to an error correction code, supplying a digital output stream of bits;
      a bit spreading module for distributing said bits over a selectable number of carriers belonging to a group of carriers that are uniformly distributed over a transmission channel, so as to constitute a frequency division multiplex;
      a time interleaving module for providing time interleaving responsive to a distribution given by the bit spreading module;
      a frequency interlacing module operating on the carriers defined by the spreader module;
      a phase modulator or a phase and amplitude modulator;
      a frequency-time transform module for delivering 30 symbols ; and
      an interface module for enabling selection of a set of operating parameters that corresponds best to actual propagation conditions and type of jamming expected, and
   at least a receiver having, in sequence:
      a time and frequency synchronizing module;
      a time-frequency transform module;
      a phase demodulator or phase/amplitude demodulator;
      a frequency deinterleaving module;
      a time deinterleaving module;
      a decoder for performing, in succession, Viterbi decoding, bit deinterleaving, and decoding; and
      a selecting interface module for selecting a set of operating parameters corresponding to those of the transmitted stream.

* * * * *